G. P. HENDERSON & J. F. PARROTT.
VEHICLE.
APPLICATION FILED OCT. 24, 1910.
1,058,864.
Patented Apr. 15, 1913.
2 SHEETS—SHEET 1.
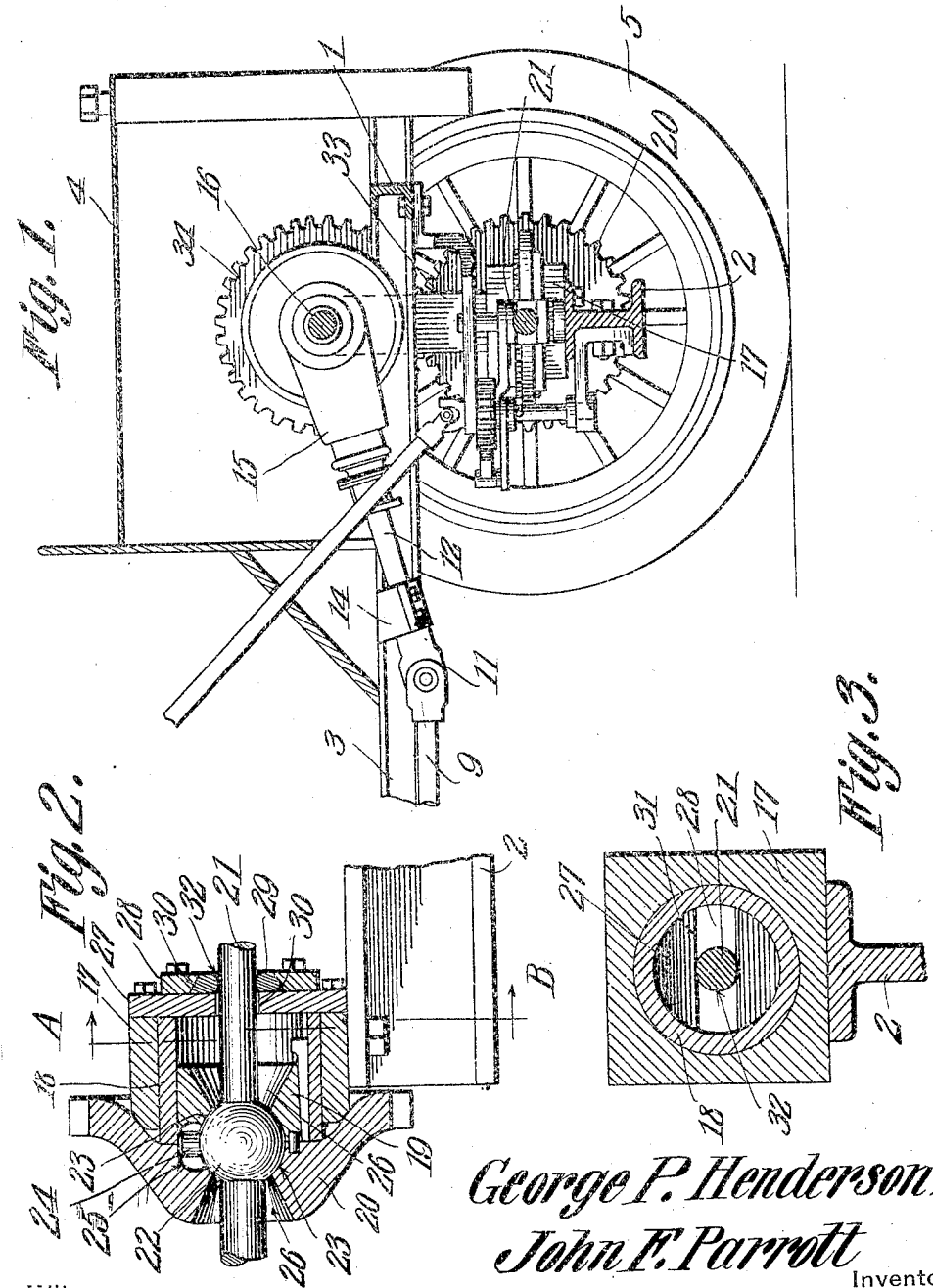
George P. Henderson and
John F. Parrott
Inventors
Witnesses
by C. A. Snow & Co.
Attorneys.

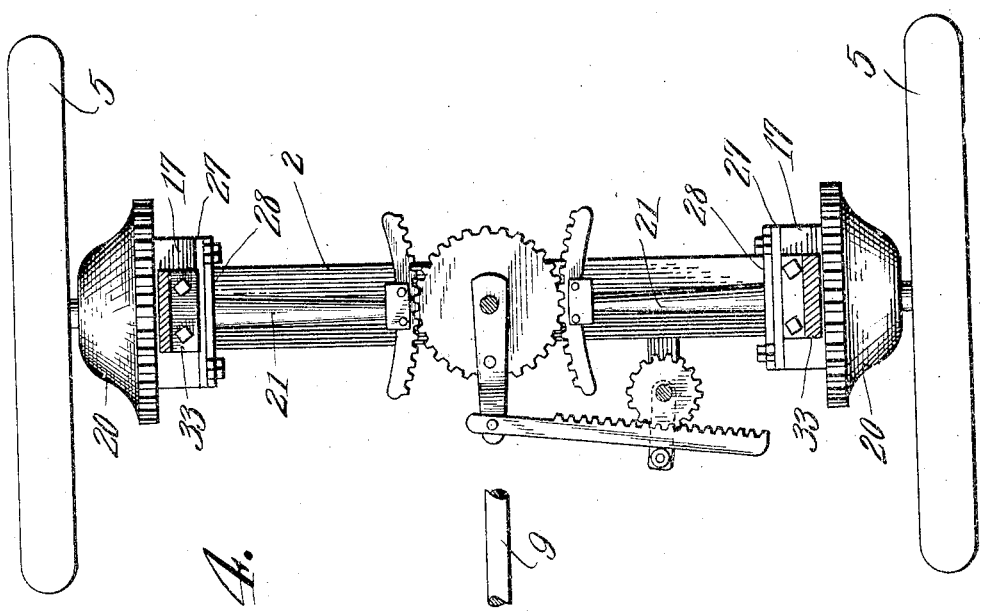
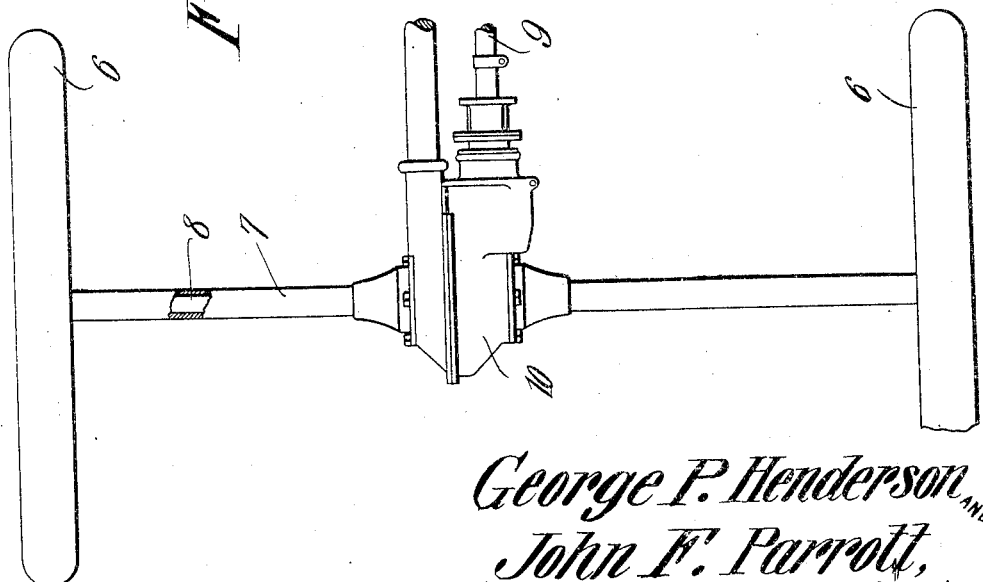

UNITED STATES PATENT OFFICE.

GEORGE P. HENDERSON AND JOHN F. PARROTT, OF PORTLAND, OREGON.

VEHICLE.

1,058,864.

Specification of Letters Patent.

Patented Apr. 15, 1913.

Application filed October 24, 1910. Serial No. 588,722.

*To all whom it may concern:*

Be it known that we, GEORGE P. HENDERSON and JOHN F. PARROTT, citizens of the United States, residing at Portland, in the county of Multnomah, State of Oregon, have invented a new and useful Vehicle, of which the following is a specification.

The device forming the subject matter of this application is adapted to be used upon automobiles, road-engines and the like, whereby both the front and rear axles of such structures may be simultaneously driven.

It is the object of this invention to provide novel means whereby both the front and rear axles of a self-propelled vehicle, may be simultaneously driven; to provide driving mechanism in a self-propelled vehicle, the component elements of which mechanism are assembled in a novel and improved manner; and, generally, to improve the driving mechanism of a motor propelled vehicle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 is a fragmental side elevation showing one form of the invention, parts being broken away; Fig. 2 is a vertical section of the mechanism whereby the axle sections are connected with the drive wheels; Fig. 3 is a vertical section on the line A—B of Fig. 2; and Fig. 4 is a top plan, the same being in the nature of a diagrammatic view.

The device forming the subject matter of this application is adapted to be employed with motor propelled vehicles of widely different types. In order, however, to present a concrete embodiment, certain details of a motor propelled vehicle will be described, it being understood that such a vehicle is but one of the many forms of structures with which the device may be assembled.

Certain portions of the frame of the vehicle are shown, for instance, a transverse upper beam 1, a transverse lower beam 2, and a longitudinal beam 3, the hood in which the engine is housed, being denoted by the numeral 4. The front wheels are denoted by the numeral 5, the rear wheels by the numeral 6, and the casing by the numeral 7, in which casing the rear axle 8 is rotatable to drive the rear wheels 6. A longitudinally extending drive shaft 9 is shown, and suitable mechanism located within a casing 10 operatively connects the drive shaft 9 with the rear axle 8. By means of a universal joint 11, the forward end of the drive shaft 9 may be connected with an auxiliary shaft 12, mounted for rotation in a bracket 14, supported upon the longitudinal beams 3 of the frame, or in any other suitable manner. The forward end of the auxiliary shaft 12 extends into a casing 15, containing suitable mechanism whereby the auxiliary shaft 12 may be connected operatively with a transverse counter shaft 16. This counter shaft 16 is supported in a manner to be described hereinafter.

Secured to the transverse lower beam 2 of the frame are spaced boxes 17. A sleeve 18 is rotatable in each of these boxes 17, and within the sleeve 18 is located a collar 19 secured to the sleeve 18 for rotation therewith. The sleeve 18 and the collar 19 constitute a bearing structure, rotatably mounted in the boxing 17.

Pinions 20, constituting drive wheels, are shown, these pinions 20 being mounted upon the forward axles 21, which axles 21 carry the front wheels 5. The axle sections 21 are provided intermediate their ends with substantially spherical heads 22. The pinions 20 and the collars 19 are disposed upon opposite sides of the heads 22, the pinions 20 and the collars 19 being provided upon their adjacent faces, with rounded bearing surfaces 23, adapted to bear against the head 22. The collar 19 is secured to the pinion 20 to rotate therewith, the collar 19 being, as hereinbefore pointed out, secured to the sleeve 18 to rotate therewith. The head 22 is provided with an outstanding lug 24, adapted to register in mating recesses 25 in the adjacent end faces of the collar 19 and the pinion 20. This lug 24 and the recesses 25 constitute interengaging elements, whereby the collar 19, the head 22 and the pinion 20 may be connected for simultaneous rotation. The remote faces of the collar 19 and the pinion 20 are provided with inwardly extended conical recesses 26 in which the forward axle section 21 is mounted. These recesses 26 permit the axle section 21 to swing in a horizontal plane with the lug 24 as a center.

To the inner face of each boxing 17 a plate 27 is secured, and to the outer face of this plate 27, horizontal guide bars 28 are attached. A closure plate 29 slides between the guide bars 28, the edges of the guide bars 28 being undercut as shown at 30, so as to hold the closure plate 29 in place.

In the plate 27 there is an elongated slot 31, seen most clearly in Fig. 3. In this slot 31, the axle section 21 is free to swing in a horizontal plane. In the closure plate 29 there is an opening 32, adapted to receive the axle section 21. This opening 32 in the plate 29 is, however, of substantially the same cross section as the axle section 21, so that as the axle section slides in the slot 31 of the plate 27, the closure plate 29 will move to and fro with the axle section. Brackets 33 are secured to the boxings 17, and it is in these brackets 33 that the counter shaft 16 is journaled for rotation.

Secured to the counter shaft 16 are spaced pinions 34, one of which is clearly seen in Fig. 1. Each of these pinions 34 meshes into one of the pinions 20.

At this point it may profitably be stated that when the drive shaft 9 is rotated to actuate the rear axle 8, the auxiliary shaft 12 will be put into rotation at the same time, causing the counter shaft 16 to rotate, the pinions 34 rotating the pinions 20, these pinions 20 engaging the lugs 24 and causing the forward axle sections 21 to rotate, thus putting the front wheels 5 into motion, under the impulse of the prime mover, and simultaneously with the rear wheels 6. The lugs 24, engaging the collars 19 will cause these collars, together with their attached sleeves 18, to rotate, the sleeves 18 being journaled for rotation in the boxings 17. However, while the forward wheels 5 are thus being rotated, it will be seen that the axle sections 21 may swing in a horizontal plane, under the impulse of suitable steering mechanism, thus permitting the vehicle to round a corner, the axle sections 21 sliding in the slots 31 in the plates 27, and carrying with them, in their sliding movement, the closure plates 29, the pinions 20 and the collars 19 serving as bearings upon which the heads 22 of the axle sections 21 swing, as the axle sections are moved to and fro in a horizontal plane, under the impulse of the steering mechanism.

From the foregoing it will be seen that both the forward and rearward axles of a motor propelled vehicle may be driven simultaneously from a common source of power, the steering of the vehicle being readily effected without interfering in any way with the positive drive of the forward axle of the vehicle.

Having thus described the invention, what is claimed is:—

1. In vehicle driving mechanism, a rigid axle section adapted to receive a traction wheel and provided with a bearing head; a drive wheel upon the axle section and bearing against one side of the head; a collar upon the axle section and bearing against the other side of the head; interengaging elements upon the head, the collar and the drive wheel to secure a simultaneous rotation thereof, but permitting the axle section to swing in the collar and drive wheel; a sleeve secured to the collar; a bearing in which the sleeve rotates, and a closure for the bearing slidable with the axle as the latter swings.

2. In vehicle driving mechanism, a frame; a boxing detachably mounted upon the frame; a rigid axle section supported for rotation and for swinging movement in the boxing and adapted to receive a traction wheel; a pinion connected with the axle section, the axle section being mounted to swing in the pinion; a member rotatable in the boxing, and to which the pinion is secured; a counter shaft rotatably supported upon the boxing; and a pinion upon the countershaft, meshing into the first specified pinion.

3. In vehicle driving mechanism, a frame; a boxing mounted upon the frame; a drive wheel; a sleeve projecting from one side of the drive wheel and journaled for rotation in the boxing; a collar located within the sleeve and detachably secured to the sleeve; and a rigid axle section, adapted to receive a traction wheel, the axle section being provided with a bearing head mounted between the drive wheel and the collar, for swinging movement, the bearing head being connected with the drive wheel to secure a rotation of the traction wheel.

4. In vehicle driving mechanism, a frame; a boxing mounted upon the frame; a bearing structure journaled for rotation in the boxing; a drive wheel connected with the bearing structure; an axle section adapted to receive a traction wheel, the axle section being mounted to swing in the drive wheel and in the bearing structure, and being operatively connected with the drive wheel to secure a rotation thereof; a plate applied to the boxing and provided with an opening in which the axle section is adapted to move; guides upon the plate; and a closure for the opening, mounted to move in the guides, and actuable by the axle section.

In testimony that we claim the foregoing as our own, we have hereto affixed our signatures in the presence of two witnesses.

GEORGE P. HENDERSON.
JOHN F. PARROTT.

Witnesses:
J. FRANK WATSON,
S. C. CATCHING.